(12) United States Patent
Meyer et al.

(10) Patent No.: US 6,709,183 B2
(45) Date of Patent: Mar. 23, 2004

(54) JOINT

(75) Inventors: Rüdiger Meyer, Amelinghausen (DE); Jörg Frohn, Lüneburg (DE)

(73) Assignee: Phoenix AG, Hamburg (DE)

(*) Notice: Subject to any disclaimer, the term of this patent is extended or adjusted under 35 U.S.C. 154(b) by 5 days.

(21) Appl. No.: 10/148,119

(22) PCT Filed: Sep. 13, 2001

(86) PCT No.: PCT/DE01/03512

§ 371 (c)(1), (2), (4) Date: May 24, 2002

(87) PCT Pub. No.: WO02/29265

PCT Pub. Date: Apr. 11, 2002

(65) Prior Publication Data

US 2002/0192020 A1 Dec. 19, 2002

(30) Foreign Application Priority Data

Sep. 28, 2000 (DE) .......................... 100 49 247

(51) Int. Cl.[7] .............................. F16B 7/00; F16D 1/12
(52) U.S. Cl. ........................ 403/26; 403/57; 403/58; 403/119; 403/150; 403/164; 403/165; 403/291; 384/192; 384/205
(58) Field of Search .......................... 403/26, 57, 58, 403/70, 73, 74, 78, 80, 119, 164, 165, 179, 291, DIG. 2, 150; 464/89, 170; 384/37, 205, 192, 224, 441, 901; 285/24, 61

(56) References Cited

U.S. PATENT DOCUMENTS

| 524,315 | A | * | 8/1894 | Diebel ................. 384/205 |
| 1,749,322 | A | | 3/1930 | Chryst |
| 2,070,051 | A | | 2/1937 | Hufferd |
| 2,682,434 | A | | 6/1954 | Guy |
| 2,875,002 | A | * | 2/1959 | McDaniel ............. 384/205 |
| 5,607,249 | A | * | 3/1997 | Maughan ............. 403/165 |

FOREIGN PATENT DOCUMENTS

| DE | 3419967 | 12/1985 |
| DE | 19629377 | 1/1998 |

* cited by examiner

Primary Examiner—Lynne H. Browne
Assistant Examiner—Victor MacArthur
(74) Attorney, Agent, or Firm—Collard & Roe, P.C.

(57) ABSTRACT

A joint having a metal or plastic core and a metal or plastic outer shell. The core has two studs extending in a direction of an axis of rotation and arranged vertically at 180° from each other. The outer shell consists of two half shells, each having a reinforcing segment. A bore with a bore base is provided on each reinforcing segment. Two cup-shaped elastomeric pads are located between the core and the outer shell and are insulated from one another. The elastomeric pads surround the studs which penetrate the bore in the reinforcing segments. A ratio of the stud diameter to the pad thickness is specified.

12 Claims, 4 Drawing Sheets

JOINT

Applicants claim priority under 35 U.S.C. §119 of GERMAN Application No. 100 49 247.9 filed on Sep. 28, 2000. Applicants also claim priority under 35 U.S.C. §365 of PCT/DE01/03512 filed on Sep. 13, 2001. The international application under PCT article 21(2) was not published in English.

BACKGROUND OF THE INVENTION

1. Field of the Invention

The invention relates to a joint with an axis of rotation X that is comprising at least the following components:
- a core made of metal or plastic (for example based on polyphenylene ether);
- an outer shell also made of metal or plastic; as well as
- a pad made of elastomeric material that is arranged between the core and the outer shell.

The material metal is of special importance for the core and the outer shell, forming a metal-and rubber joint (Megi® joint).

Constructions made with non-elastomeric materials are frequently employed for permitting large angles of torsion in joints. The joint is embodied in this connection in the form of a ball-like, sliding pairing (metal/sliding material), so that mobility is possible around all axes.

2. Prior Art

An elastic joint with the structure of the type of joint specified above is described in patent document DE 34 19 967 C2. Provision is made in this patent for a core with a belly extending all around. The pad made of elastomeric material, which is extending all around as well, is clamped between the cylindrical outer shell (sleeve) and the core. The joint can be stressed both radially and axially, whereby deflections and angles of distortion of the type occurring in universal joints, are possible as well.

3. Summary of the Invention

Now, for the purpose of permitting large angles of torsion around only one axis, the aim is to provide a joint of the type specified above, which, in addition to realizing large angles of torsion around one axis, is capable of absorbing high forces perpendicular to the axis of rotation X as well. Such high forces occur as a result of the resetting moment occurring when the joint is subjected to torsional strain.

Said problem is solved according to the invention in that
- the core is provided with two studs arranged vertically at 180° from each other and extending in the direction of the axis of rotation X;
- outer shell is comprised of two half-shells, whereby each half-shell is provided with a reinforcing segment, whereby in turn a bore with a bore base is present inside each segment, and whereby the corresponding stud penetration the associated bore; and that
- a pad encloses each stud and enters the respective bore as well, and whereby, furthermore, the two pads are arranged insulated against each other.

Useful further developments of the joint as defined by the invention, which is used particularly in systems for driving along the gudgeon in a rail-borne vehicle, are also disclosed.

For assuring the permanent function, it is especially useful if the pad consisting of elastomeric material is initially tensioned in the direction of the stud ends against the latter. This is made possible by arranging the half-shells out of center, which, when initially tensioned against each other, are then forming a closed ring.

BRIEF DESCRIPTION OF THE DRAWING

Now, the invention is explained in the following with the help of exemplified embodiments and by reference to drawings, in which.

DETAILED DESCRIPTION OF THE INVENTION

Figure 1:
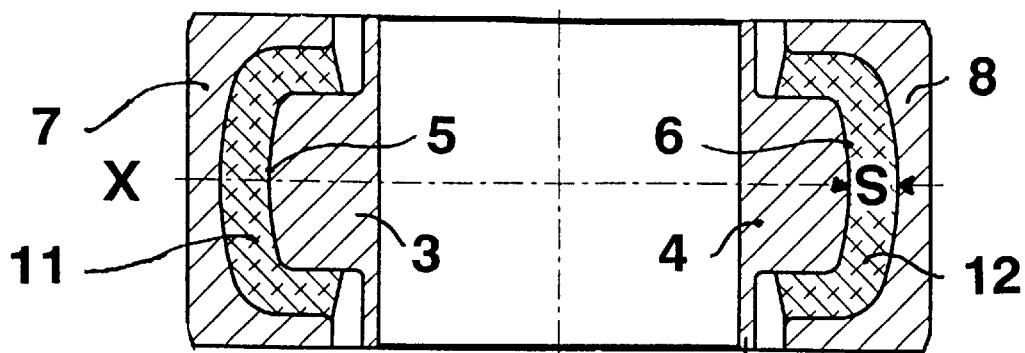
FIGS. 1 to 3 show three different views of a joint.
Figure 2:
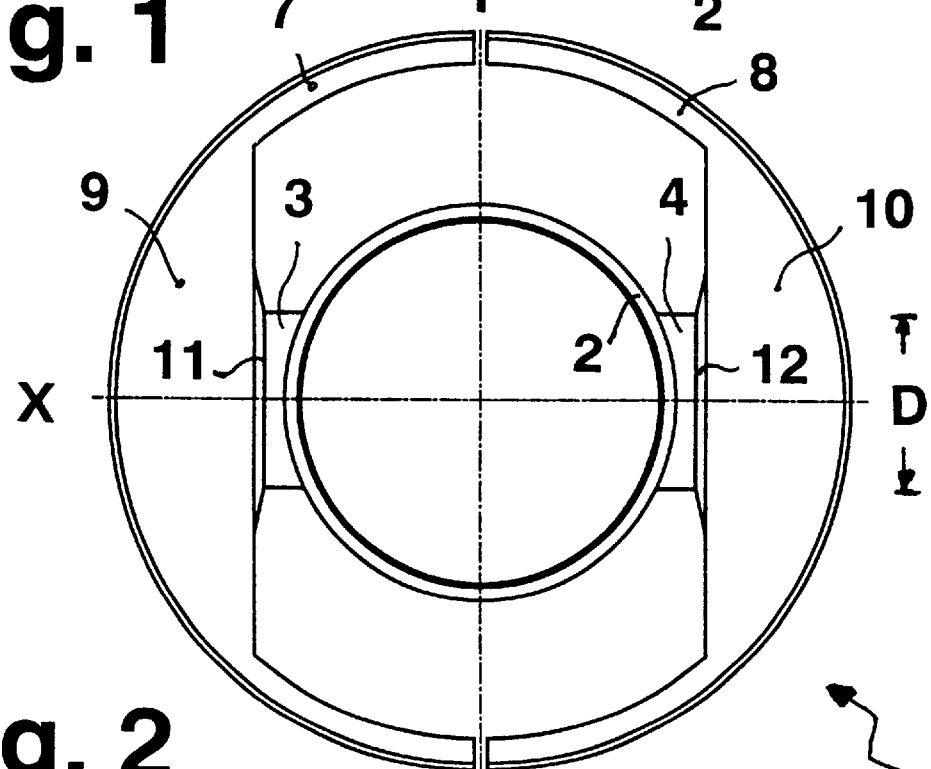
Figure 3:
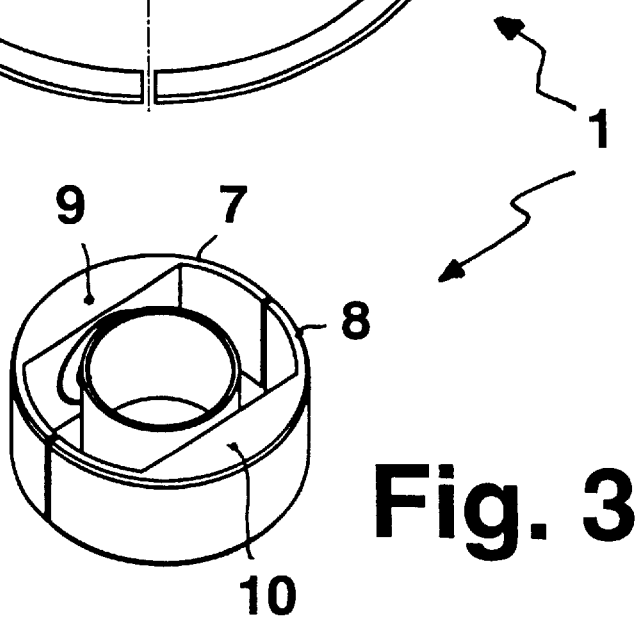

FIGS. 1 to 3 show a joint 1, the cylindrical core 2 of which is provided with the studs 3 and 4, which are arranged vertically at 180° in relation to each other and extend in the direction of the axis of rotation X. The cross section areas of these studs are substantially circular. The pads 11 and 12, which are made of elastomeric material, each almost completely surround in this connection the studs (FIG. 1) in the form of cups (pots), whereby the ratio of the diameter "D" of the studs and the layer thickness "S" of the pads amounts to $$D:S=2:1 \text{ to } 6:1.$$

The particularly useful parameters in this regard are as follows:

$$D:S=3:1 \text{ to } 5:1, \text{ particularly } 4:1.$$

Furthermore, it is useful if these pads, which each have a convex shape, are initially tensioned in the direction of the ends 5 and 6 by 10% to 15%, in particular by 14%, of their layer thickness S.

The two pads 11 and 12 themselves are arranged insulated against each other, as opposed to the pad construction according to DE 34 19 967 C2.

Figure 4:
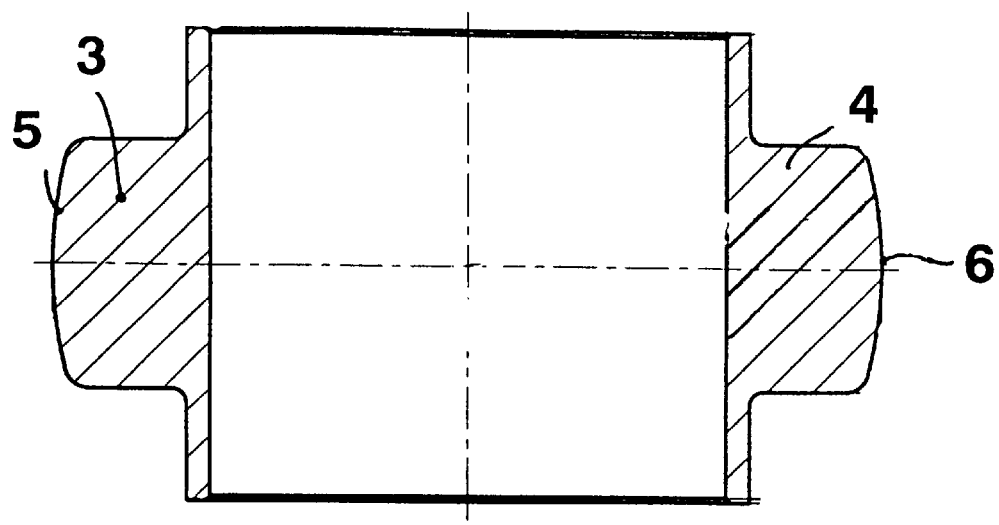
FIGS. 4 to 6 show three different views of a core with a stud.
Figure 5:
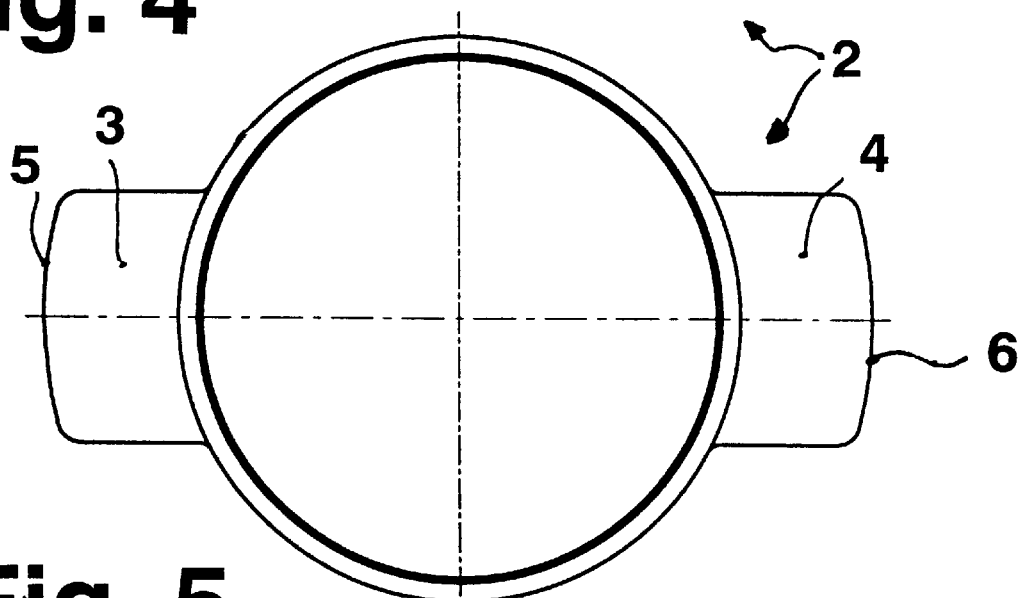
Figure 6:
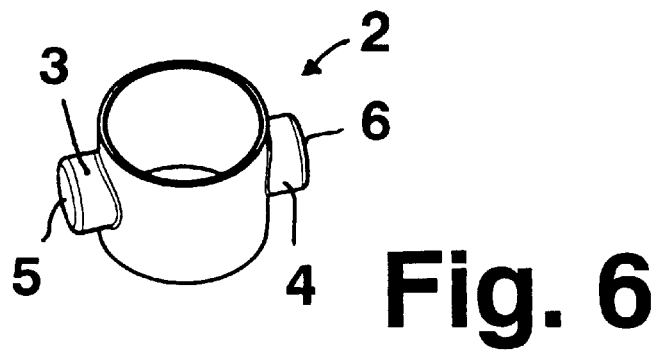

The novel construction of the core is particularly shown again optically in FIGS. 4 to 6.

According to FIGS. 1 to 3, the outer shell of the joint 1 is comprised of the two half-shells 7 and 8, whereby their plane of separation Y (FIG. 2) is extending perpendicular to the axis of rotation X. Each half-shell is provided in this connection with a reinforcing segment 9 and 10, respectively.

Figure 7:
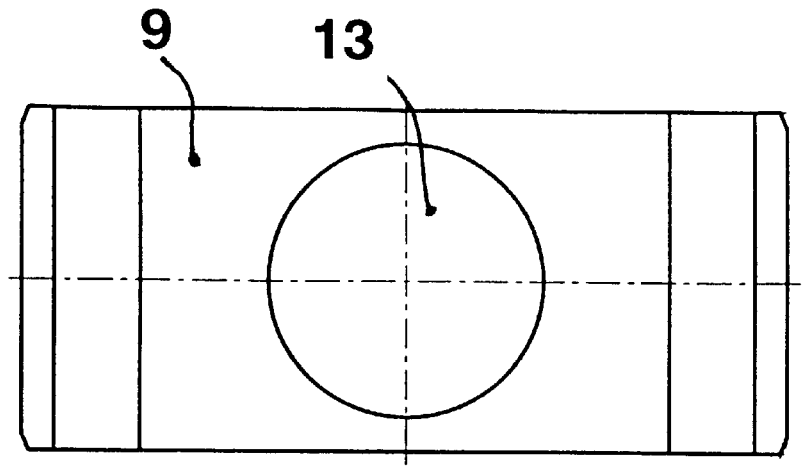
FIGS. 7 to 9 show three different views of a half-shell with a bore.
Figure 8:
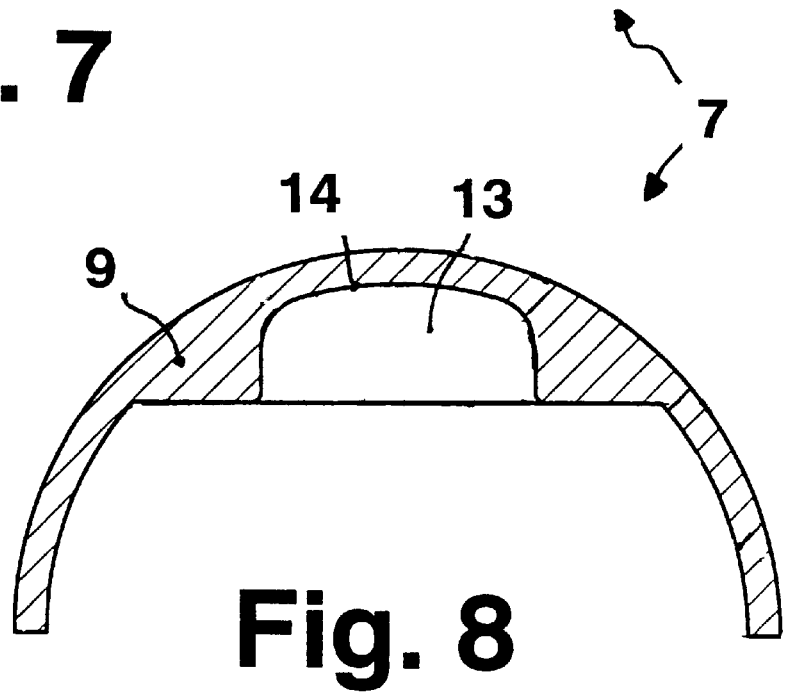
Figure 9:
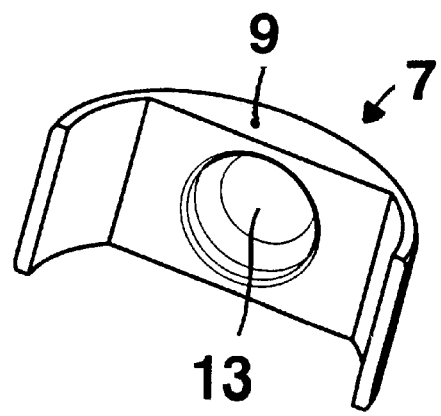

Now, the details of the construction of the reinforcing segment 9 are shown on the half-shell 7 in FIGS. 7 to 9.

A bore 13 with the base 14 of the bore is present within the segment 9 of the half-shell 7, whereby the base of the bore is forming the peripheral limitation of the outer shell. In this connection, the bore is arranged corresponding with the associated stud, whereby the corresponding pad is received in the associated bore (FIG. 1).

Figure 10:
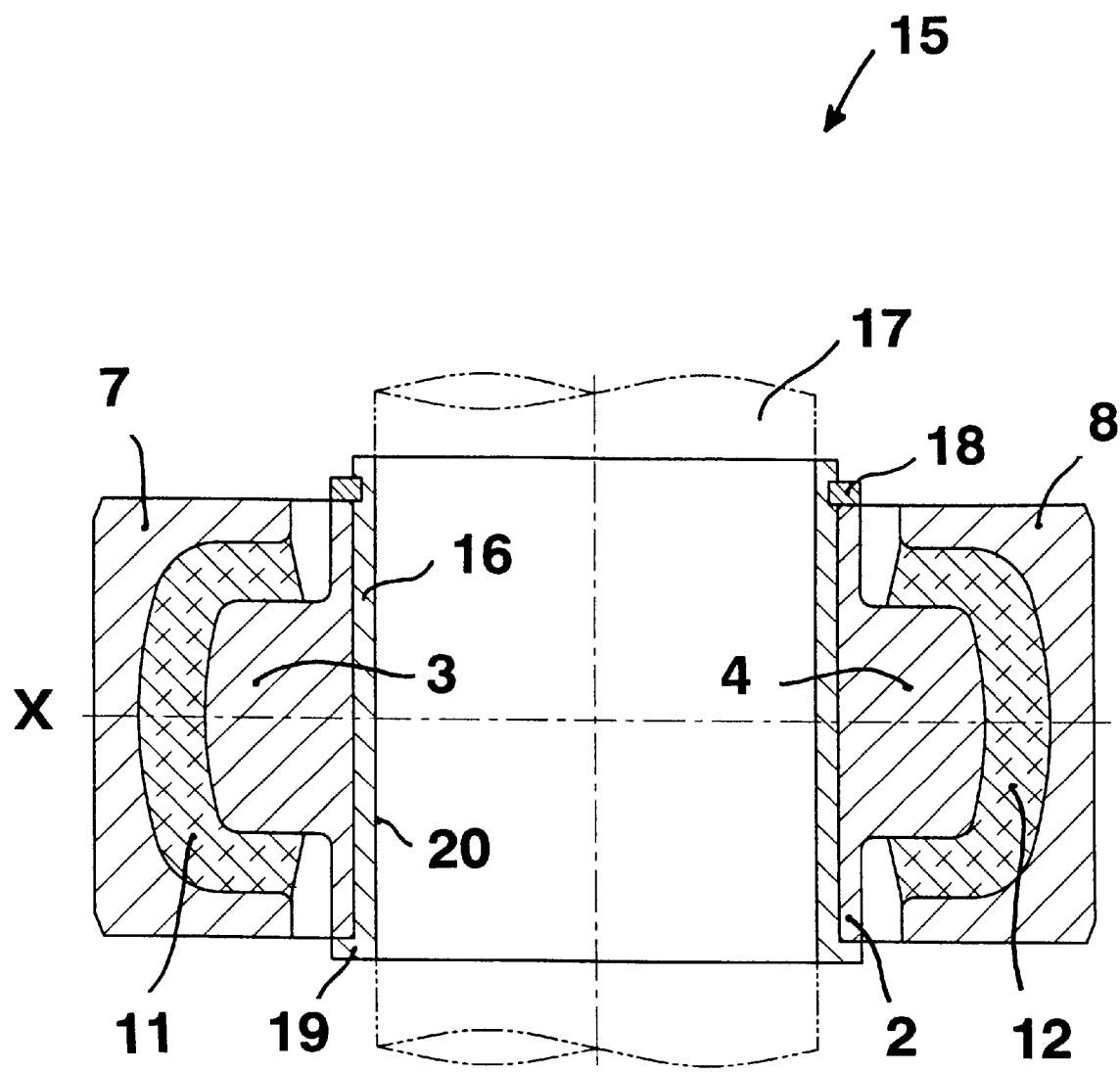
FIG. 10 shows a joint with an additional sliding bush.

Now, FIG. 10 shows a joint 15, whereby a sliding bush is inserted in the interior of the core 2 perpendicular to the axis of rotation X for receiving free of force in one direction a cylindrical component 17. The core 2 with the two studs 3 and 4 in anchored as an integrated part of the sliding bush by means of a ring flange 19. The sliding surface 20 is located between the sliding bush and the cylindrical structural component.

The core 2 with the two studs 3 and 4 may be designed in the form of a spherical segment as well.

| List of Reference Numerals and Letters |
| --- |
| 1 Joint (first exemplified embodiment) |
| 2 Core |
| 3 Stud |
| 4 Stud |
| 5 End of stud |
| 6 End of stud |
| 7 Outer shell (half-shell) |
| 8 Outer shell (half-shell) |
| 9 Segment of half-shell |
| 10 Segment of half-shell |
| 11 Pad made of elastomeric material |
| 12 Pad made of elastomeric material |
| 13 Bore |
| 14 Base of bore (peripheral limitation) |
| 15 Joint (second exemplified embodiment) |
| 16 Sliding bush |
| 17 Cylindrical structural component |
| 18 Anchoring element (anchoring ring) |
| 19 Flange (ring flange) of sliding bush |
| 20 Sliding surface |
| D Stud diameter |
| S Layer thickness of pad |
| X Axis of rotation |
| Y Plane of separation between the two half-shells |

What is claimed is:

1. A joint with an axis of rotation X, the joint comprising:
 (a) a core made of metal or plastic;
 (b) two studs disposed on said core, wherein said studs are arranged vertically at 180° from each other, extend in a direction of the axis of rotation X, and have a diameter D;
 (c) an outer shell made of metal or plastic, said outer shell comprising two half-shells; said two half-shells each comprising a reinforcing segment;
 (d) a bore having a bore base disposed on each of said reinforcing segments; and
 (e) two pads disposed between said core and said outer shell, wherein said two pads are made of elastomeric material, have a cup-shaped contour, and have a thickness S;
 wherein each of said two studs penetrates said bore disposed on each of said reinforcing segments;
 wherein each of said two pads surrounds one of said two studs and is received in said bore;
 wherein said two pads are arranged insulated against one another; and
 wherein a ratio of said diameter D of said studs to said thickness S of said pads is approximately 2:1 to 6:1.

2. The joint according to claim 1, wherein said core has a cylindrical shape.

3. The joint according to claim 1, wherein said two studs have a substantially circular cross sectional shape.

4. The joint according to claim 1, wherein a shape of an end of said two studs is convex.

5. The joint according to claim 1, wherein an end of said two studs and an associated bore base have a corresponding surface structure.

6. The joint according to claim 1, wherein a plane of separation Y of said the two half-shells extends perpendicular to the axis of rotation X.

7. The joint according to claim 1, wherein a ratio of said diameter D of said studs to said thickness S of said pads is approximately 3:1 to 5:1.

8. The joint according to claim 1, wherein a ratio of said diameter D of said studs to said thickness S of said pads is approximately 4:1 D.

9. The joint according to claim 1, wherein said two pads are initially tensioned in a direction of an associated stud ends of said two studs by 10 to 15% of said thickness S.

10. The joint according to claim 1, wherein said two pads are initially tensioned in a direction of an associated end of said two studs by 14% of said thickness S.

11. The joint according to claim 1, wherein a sliding bush for receiving in one direction free of force a cylindrical structural component is inserted in an interior of said core perpendicular to the axis of rotation X.

12. The joint according to claim 11, wherein said core is anchored on said sliding bush as an integrated part of said sliding bush by means of a flange and an anchoring element.

* * * * *